United States Patent
Takasaki et al.

(10) Patent No.: US 6,244,386 B1
(45) Date of Patent: Jun. 12, 2001

(54) LUBRICATION APPARATUS IN POWER TRANSMISSION UNIT

(75) Inventors: Toshiharu Takasaki, Kanagawa; Hirotaka Kusukawa, Tokyo, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/304,836

(22) Filed: May 5, 1999

(30) Foreign Application Priority Data

May 15, 1998 (JP) .................................. 10-133887

(51) Int. Cl.⁷ .................................................. F01M 11/06
(52) U.S. Cl. .......................................... 184/11.2; 384/472
(58) Field of Search .......................... 184/11.1, 11.2, 184/13.1; 74/467; 475/160; 384/404, 406, 462, 465, 472, 473

(56) References Cited

U.S. PATENT DOCUMENTS

| | | | |
|---|---|---|---|
| 1,631,217 | * | 6/1927 | Matthews ............................ 184/13.1 |
| 1,771,835 | * | 7/1930 | Bartlett ................................ 184/13.1 |
| 1,787,428 | * | 1/1931 | Fekete et al. ....................... 384/404 |
| 2,191,326 | * | 2/1940 | Smith et al. ........................ 184/13.1 |
| 2,195,877 | * | 4/1940 | Steedman ............................ 384/472 |
| 2,583,317 | * | 1/1952 | Belich ................................. 184/13.1 |
| 3,383,937 | * | 5/1968 | Toenne et al. ......................... 74/467 |
| 3,763,961 | * | 10/1973 | Casale ................................. 184/11.2 |
| 3,857,462 | * | 12/1974 | Kaufman et al. .................... 184/11.2 |
| 4,217,794 | * | 8/1980 | Yasui et al. ............................ 74/467 |
| 4,242,923 | | 1/1981 | Nishikawa et al. .................... 74/700 |
| 4,348,914 | * | 9/1982 | Kawamoto ............................. 74/467 |
| 4,612,818 | * | 9/1986 | Hori et al. .............................. 74/467 |
| 4,677,871 | | 7/1987 | Taniyama et al. ...................... 74/467 |
| 5,232,292 | * | 8/1993 | Kuan .................................... 384/462 |
| 5,316,106 | * | 5/1994 | Baedke et al. ....................... 184/11.2 |
| 5,328,275 | * | 7/1994 | Winn et al. ........................... 384/472 |
| 5,499,902 | * | 3/1996 | Rockwood ........................... 184/11.2 |
| 5,513,964 | * | 5/1996 | Rockwood ........................ 417/423.13 |
| 5,591,020 | * | 1/1997 | Rockwood ........................... 184/11.2 |
| 5,647,735 | * | 7/1997 | Rockwood ........................... 184/11.2 |
| 5,699,877 | * | 12/1997 | Dreier .................................. 184/11.2 |
| 6,109,393 | * | 8/2000 | Toyota et al. ........................ 184/11.2 |

FOREIGN PATENT DOCUMENTS

| | | |
|---|---|---|
| 825 359 | 11/1951 | (DE) . |
| 19 79 972 | 2/1968 | (DE) . |
| 2142 249 | 3/1973 | (DE) . |
| 27 33 294 A1 | 2/1978 | (DE) . |
| 41 15 381 A1 | 11/1991 | (DE) . |
| 40 23 354 A1 | 1/1992 | (DE) . |
| 0 167 388 | 1/1986 | (EP) . |

OTHER PUBLICATIONS

German periodical, Maschinenmarkt, Wurzburg 86, 1980, pp. 1043 to 1046.
Patent Abstracts of Japan of Published Publication 2–62462(A) (Sobotani).
Patent Abstracts of Japan of Published Publication 3–288055(A) (Yamashita).

* cited by examiner

Primary Examiner—David A. Bucci
Assistant Examiner—Chong H. Kim
(74) Attorney, Agent, or Firm—Foley & Lardner

(57) ABSTRACT

A lubrication apparatus in a vehicular power transmission unit includes device pinion shaft which is rotatably supported by a bearing disposed at a rear end portion of a casing. The casing contains lubricating fluid. A pickup member is disposed on the drive pinion shaft and picks up lubricating fluid upon rotation of the drive pinion shaft. A trough is formed on a wall of the casing in an inclined relation to the axis of the drive pinion shaft. The trough receives the lubricating fluid which is picked up and allows the lubricating fluid to flow under the influence of gravity to the rear end portion of the casing for lubricating the bearing located thereof.

3 Claims, 2 Drawing Sheets

LUBRICATION APPARATUS IN POWER TRANSMISSION UNIT

BACKGROUND OF THE INVENTION

This invention relates to a power transmission unit for motor vehicles, and more specifically to a lubrication apparatus for use in the power transmission unit which can provide good lubrication of bearings supporting an elongated rotary shaft within a casing of the power transmission unit even when the vehicle body is in an inclined state.

There is known as a related art a lubrication apparatus used in a final drive and differential unit for motor vehicles, of such a type that includes a casing elongated in a fore-and-aft direction of the motor vehicle and receiving lubricating fluid, a differential case arranged at a rear end of the casing, a differential gear unit rotatably disposed within the differential case, a drive gear mounted to the differential case, and a drive pinion shaft that is formed with a drive pinion meshing with the drive gear. The drive pinion shaft is elongated forward to be connected with a front-wheel side trans-axle via a propeller shaft. The drive pinion shaft is rotatably supported by a pair of axially spaced tapered roller bearings at a rear portion thereof near the differential case and by a ball bearing of a sealing type at a front portion thereof. The ball bearing of the sealing type is filled with grease. With this arrangement, when the motor vehicle is in a normal horizontal position, the roller bearings and the ball bearing are immersed in the lubricating fluid to be sufficiently lubricated. On the other hand, when the motor vehicle runs on a rapid ascent, the ball bearing lifts up from the level of the lubricating fluid whereby positive lubrication of the ball bearing is not achieved. This is the reason why the ball bearing of the sealing type is used at the front portion of the drive pinion shaft. Meanwhile, when the motor vehicle runs on a rapid descent, the roller bearings at the rear portion of the drive pinion shaft are still immersed in the lubricating fluid owing to a volumetric difference between a front end portion of the casing and a rear end portion thereof.

SUMMARY OF THE INVENTION

It will be noted that the related art requires three bearings by which the elongated drive pinion shaft is rotatably supported relative to the casing. This causes increase in weight and manufacturing cost of the motor vehicle. Further, it is required to use the expensive bearing of the sealing type described above, for providing lubrication of the bearing that lifts up from the level of the lubricating fluid within the casing in response to inclination of the vehicle body upon the motor vehicle running on a slope. The manufacturing cost thus will more increase due to the use of the expensive bearing of the sealing type.

It is an object of the present invention to provide a lubrication apparatus in a vehicular power transmission unit that is capable of providing good lubrication of a bearing supporting a shaft within a casing, even when the bearing lifts up from the level of lubricating fluid within the casing in response to inclination of the casing upon the motor vehicle running on a slope, and serving for reducing the manufacturing cost and the weight of the vehicle body.

According to one aspect of the present invention, there is provided a lubrication apparatus in a power transmission unit for a motor vehicle, comprising:

a shaft having an axis and being rotatable about the axis;

a casing receiving said shaft, said casing having opposed axial end portions spaced in a direction of the axis of said shaft;

a bearing supporting said shaft and disposed at one of the opposed axial end portions of said casing;

a lubricating fluid within said casing, said lubricating fluid having a level;

pickup means for picking up the lubricating fluid within said casing upon rotation of said shaft, said pickup means being disposed on said shaft and having a portion below the level of said lubricating fluid; and guide means cooperating with said pickup means for supplying said bearing with the lubricating fluid, said guide means allowing the lubricating fluid picked up to flow by gravity to the one of the opposed axial end portions of said casing, said guide means being dispose on said casing.

According to a further aspect of the present invention, there is provided a lubrication apparatus in a power transmission unit for a motor vehicle, comprising:

a shaft having an axis and being rotatable about the axis;

a casing receiving said shaft, said casing having an axis and opposed axial end portions spaced in a direction of the axis of said shaft;

a bearing supporting said shaft, said bearing being disposed at one of the opposed axial end portions of said casing;

a lubricating fluid within said casing, said lubricating fluid having a level;

a pickup member picking up said lubricating fluid within said casing upon rotation of said shaft, said pickup member being disposed on said shaft and having a portion below the level of said lubricating fluid; and a trough allowing said lubricating fluid picked up to flow by gravity to the one of the opposed axial end portions of said casing, said trough being disposed on said casing and extending between the opposed axial end portions of said casing.

According to a still further aspect of the present invention, there is provided a method of lubricating a bearing supporting a shaft within a power transmission casing of a motor vehicle, said shaft having an axis and being rotatable about the axis, said power transmission casing having opposed axial end portions spaced in the axial direction of the shaft and containing lubricating fluid, said bearing being disposed at one of the opposed axial end portions of the casing, the method comprising:

picking up the lubricating fluid within the casing upon rotation of the shaft; and guiding the lubricating fluid picked up, by gravity, to the one of the opposed axial end portions of the casing.

DETAILED DESCRIPTION OF THE INVENTION

Figure 1:
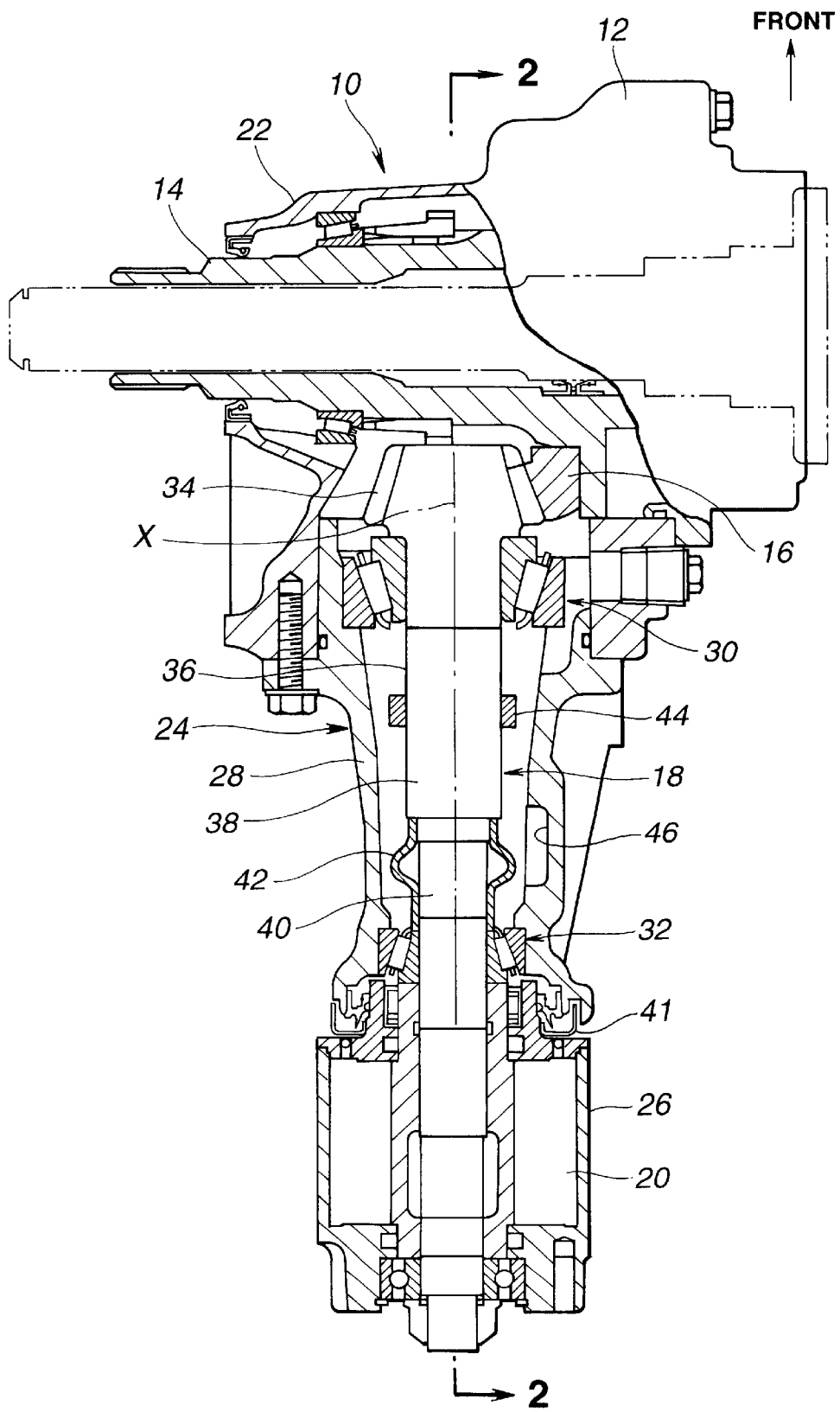
FIG. 1 is a cross section of a trans-axle of a motor vehicle, taken along the line 1—1 of FIG. 2, to which a lubrication apparatus according to the present invention is applied.

Referring now to FIG. 1, there is shown a trans-axle 10 of a four-wheel drive vehicle of a front wheel drive type. The trans-axle 10 is arranged on the front wheel side of the vehicle.

As illustrated in FIG. 1, the trans-axle 10 includes a housing 12 elongated in a fore-and-aft direction of the vehicle body. An input shaft 14 is rotatably disposed within the housing 12, to which a power is transmitted from a center differential gear, not shown. A hypoid gear 16 is mounted to the input shaft 14, with which a drive pinion shaft 18 rearward extending is meshed. A viscous coupling 20 is disposed on a rear side of the drive pinion shaft 18 and connected through a propeller shaft with a final drive gearing, not shown, on the rear wheel side.

The housing 12 includes a casing 22 for the input shaft 14, a casing 24 for the drive pinion shaft 18, and a casing 26 for the viscous coupling 20. These casings 22, 24 and 26 are coupled together by using fastening bolts. The casing 24 includes a wall 28 defining a cavity. The cavity includes a less volumetric portion that is disposed at a rear end portion of the casing 24 and has a volume smaller than at a front end portion thereof. Lubricating fluid is contained within the cavity as explained later. The drive pinion shaft 18 is supported by a pair of tapered roller bearings 30 and 32 within the cavity.

The drive pinion shaft 18 has an axis X and is rotatably supported about the axis X by the tapered roller bearings 30 and 32. The tapered roller bearings 30 and 32 are arranged in a spaced relation to each other in the axial direction of the drive pinion shaft 18. Specifically, the tapered roller bearings 30 and 32 are mounted onto an inner peripheral surface of the wall 28 at the front and rear end portions of the casing 24, respectively. The rear-side tapered roller bearing 32 has a reduced diameter smaller than the front-side tapered roller bearing 30 so as to be arranged within the less volumetric portion of the cavity of the casing 24. The drive pinion shaft 18 includes a drive pinion 34 and a shaft 36 connected with the drive pinion 34. The shaft 36 includes a large-diameter portion 38 disposed at one end adjacent to the drive pinion 34 and a small-diameter portion 40 disposed at the opposite end. The front-side tapered roller bearing 30 supports the large-diameter portion 38 located in an inner race thereof and the rear-side tapered roller bearing 32 supports the small-diameter portion 40 located in an inner race thereof. Reference numeral 41 denotes a seal restraining leakage of the lubricating fluid from the casing 24, which is contacted with an outer periphery of the viscous coupling 20.

A spacer 42 is mounted on the small-diameter portion 40 of the drive pinion shaft 18. The spacer 42 extends between a front end face of the inner race of the tapered roller bearing 32 and a radially extending rear end face of the large-diameter portion 38 that cooperates an the outer circumferential surface of the small-diameter portion 40 to form a stepped portion therebetween. The spacer 42 is formed with a radially outwardly swelled portion at an axial-middle portion thereof, which projects into the cavity of the casing 24.

A pickup member 44 acting as a lubricant supplier is disposed on a substantially axial-middle portion of the large-diameter portion 38 of the drive pinion shaft 18. The pickup member 44 is in the form of a cylindrical ring that is mounted to the large-diameter portion 38. The pickup member 44 may be a toothed ring having teeth arranged at a predetermined pitch on an outer circumferential surface thereof. The pickup member 44 is partly immersed in the lubricating fluid within the cavity of the casing 24. Upon rotation of the drive pinion shaft 18, the pickup member 44 unitedly rotates about the axis X therewith to pick up the lubricating fluid within the cavity of the casing 24.

Figure 2:
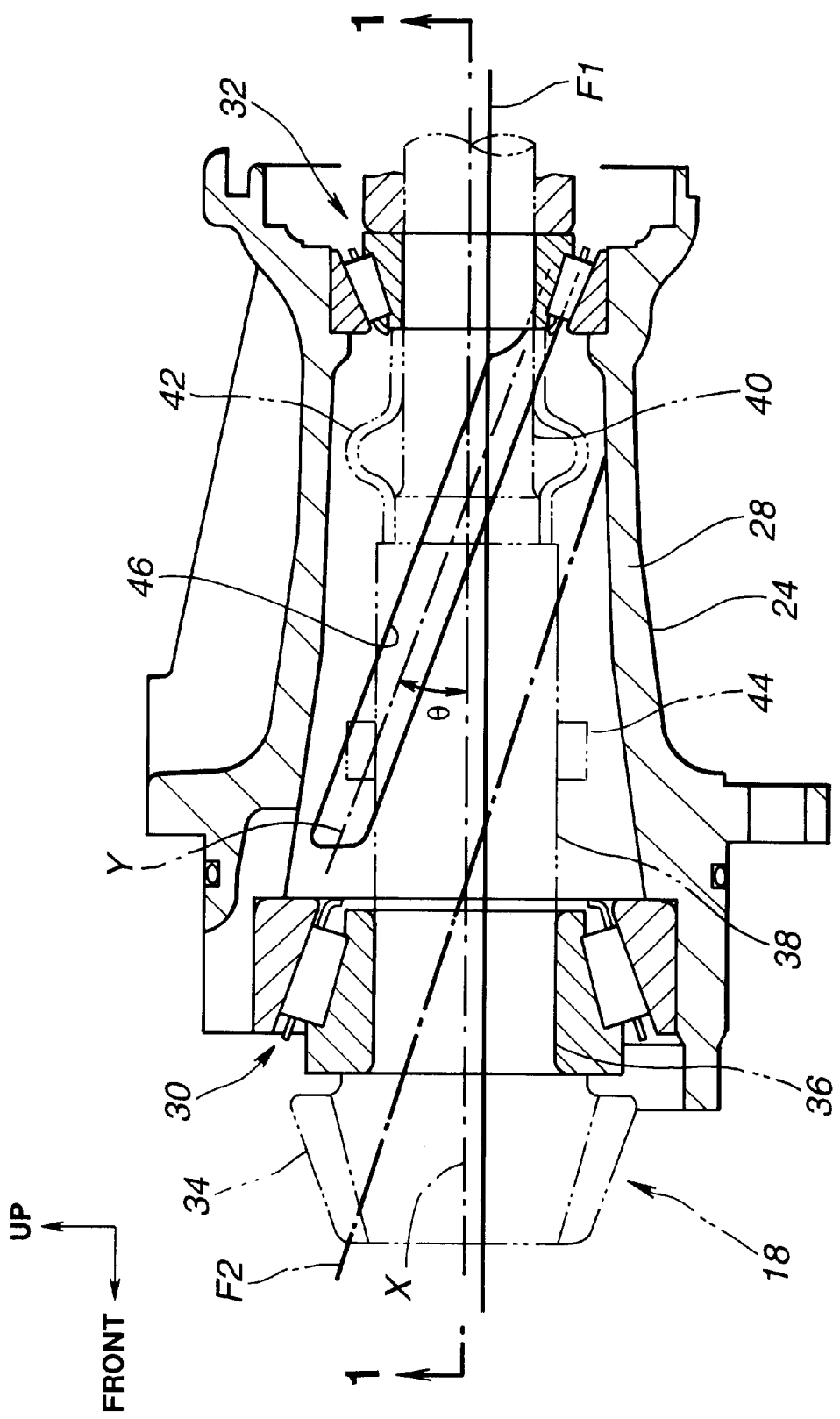
FIG. 2 is an enlarged cross section, taken along the line 2—2 of FIG. 1, showing an important part of the lubrication apparatus.

A trough 46 cooperating with the pickup member 44 to supply the rear-side tapered roller bearing 32 with the lubricating fluid, is disposed on the wall 28 of the casing 24 and extends between the front and rear end portions of the casing 24. The trough 46 receives the lubricating fluid picked up by the pickup member 44, allowing the lubricating fluid to flow by gravity to the tapered roller bearing 32. The trough 46 includes a guide surface for guiding the lubricating fluid toward the rear-side tapered roller bearing 32. As illustrated in FIG. 2, the trough 46 extends from near the front end portion of the casing 24 to near the rear end portion thereof and is inclined relative to the axis X of the drive pinion shaft 18 at a predetermined angle θ. The trough 46 extends along a skew line Y inclining relative to the axis X at the predetermined angle θ and traversing a hypothetical horizontal plane containing the axis X. The predetermined angle θ may be not less than a critical stability angle of the motor vehicle at which the motor vehicle can be prevented from slipping down when the motor vehicle is stopped on a slope. The predetermined angle θ not less than the critical angle is preferable for ensuring steady supply of the lubricating fluid to the rear-side tapered roller bearing 32 upon the motor vehicle running on a sloped road surface. The trough 46 includes a front end disposed at a position higher than the hypothetical horizontal plane and a rear end disposed at a position lower than the hypothetical horizontal plane. The trough 46 includes a portion gradually decreasing in cross section toward the rear end as shown in FIG. 2. The rear end of the trough 46 thus has a reduced cross section and faces to near a lower-most outer periphery of an outer race of the rear-side tapered roller bearing 32 that is located in the lower-most position as viewed in FIG. 2.

The trough 46 also includes a portion facing to an upper-most portion as viewed in FIG. 2, of the pickup member 44. Specifically, when viewed in cross section taken along a line perpendicular to the axis X, a portion of a sloped upper peripheral edge of the trough 46 is substantially aligned with a tangent line of a circle defined by an outer circumferential profile of the pickup member 44. The pickup member 44 is so configured as to be in such the alignment relation to the trough 46. In this embodiment, the trough 46 is in the form of a groove that is formed on the inner peripheral surface of the wall 28. The groove has a generally rectangular-shaped cross section as shown in FIG. 1 and the guide surface including two sloped surfaces circumferentially spaced and an intermediate surface interconnecting the two sloped surfaces as shown in FIG. 2.

An operation of the embodiment of the lubrication apparatus will be explained hereinafter with reference to FIG. 2.

Assuming that, when the motor vehicle runs on a substantially horizontal road surface, the lubricating fluid within the casing 24 has a level indicated by the solid line F1 and the level F1 is positioned below the hypothetical horizontal plane containing the axis X of the drive pinion shaft 18, the front- and rear-side tapered roller bearings 30 and 32 are partly immersed in the lubricating fluid. In this condition, upon rotation of the drive pinion shaft 18, tapered rollers of the bearings 30 and 32 rotate about center axes thereof and revolve around the axis X of the drive pinion shaft 18. The tapered rollers of the bearings 30 and 32 are immersed in the lubricating fluid one after another, whereby the lubrication of the front- and rear-side bearings 30 and 32 is sufficiently conducted.

When the motor vehicle runs on a rapid descent, the vehicle body is in a forwardly inclined state in which the front end portion of the casing 24 is positioned lower than the rear end portion thereof and the level of the lubricating fluid within the casing 24 is indicated by the dotted line F2. This is because the volume of the cavity of the front end portion of the casing 24 is greater than the volume of the cavity of the rear end portion thereof as described above. In such a condition, the front-side tapered roller bearing 30 is kept immersed in the lubricating fluid while the rear-side tapered roller bearing 32 lifts up from the level F2 of the lubricating fluid to be out of contact therewith. Then, the pickup member 44 is held in a condition immersed in the lubricating fluid. The lubricating fluid is picked up by the pickup member 44 upon unitary rotation of the pickup member 44 with the drive pinion shaft 18. The lubricating fluid picked up is splashed onto the inner peripheral surface of the wall 28 of the casing 24 as a result of the effects of centrifugal force. The trough 46 on the inner peripheral surface of the wall 28 is supplied with the lubricating fluid splashed and guides the lubricating fluid toward the rear-side tapered roller bearing 32. The lubricating fluid flowing in the trough 46 spills over at the rear end of the trough 46 and is supplied to the tapered roller of the rear-side bearing 32. The spillover of the lubricating fluid can be easily caused by the rear end of the trough 46 that is reduced in cross section, whereby more positive lubrication of the tapered roller bearing 32 can be carried out. When the motor vehicle runs on a gentle descent slope and the inclination of the vehicle body is smaller, the spacer 42 is immersed in the lubricating fluid within the cavity and picks up the lubricating fluid on an outer peripheral surface of the swelled portion thereof, as well as the pickup member 44. This results in increase in amount of the lubricating fluid supplied to the trough 46.

Even if the drive pinion shaft 18 of the front wheel-side trans-axle 10 is required to be elongated in the fore-and-aft direction of the vehicle by such a demand as to avoid interference with a rack shaft of a steering gearing, the elongated drive pinion shaft 18 can be supported by only the two bearings 30 and 32 at its opposed axial ends as explained in the embodiment. Thus, the number of the bearings required can be reduced to the minimum. This contributes to reduction of the manufacturing cost and the weight of the trans-axle. Further, with the arrangement of the present invention, the expensive sealing-type bearing employed in the aforementioned related art can be omitted, whereby the cost performance will be improved.

Furthermore, since the pickup member 44 of the cylindrical ring shape does not cause a large load to be applied to the drive pinion shaft 18 upon unitary rotation therewith, the drive pinion shaft 18 can be smoothly rotated with less influence of the load caused by the pickup member 44.

When the motor vehicle runs on an ascent, the vehicle body is conditioned in such an inclined state that the front portion is positioned higher than the rear portion. With the configuration of the casing 24 in which the cavity is less in volume at the rear end portion than that at the front end portion, and with the arrangement of the front-side bearing 30 having the larger diameter than the rear-side bearing 32, the rear-side bearing 32 is still kept fully immersed in the lubricating fluid within the cavity and, therefore, allowed to be sufficiently lubricated.

Meanwhile, when the motor vehicle runs on a descent slope inclined at approximately the critical angle for stability of the motor vehicle, the motor vehicle is actually operated at a lowered speed wherein the number of rotation of the drive pinion shaft 18 decreases. In this case, even if there occurs a relatively small lack of the lubricating fluid to be supplied to the rear-side bearing 32, it will not cause serious problems. Accordingly, the predetermined angle θ of the inclination of the trough 46 may be less than the critical angle.

The apparatus of the present invention is not limited to the aforementioned embodiment wherein the drive pinion shaft 18 is connected with the viscous coupling 20 and it may be applied to a drive pinion shaft directly coupled with a propeller shaft.

Further, the apparatus of the present invention is not limited to the aforementioned embodiment wherein the rotary shaft elongated in the fore-and-aft direction is the drive pinion shaft 18 of the trans-axle 10, and it may be applied to a drive pinion shaft of a final drive and differential unit as mentioned in the above related art. Furthermore, the apparatus of the present invention may be applied to a rotary shaft extending in a lateral direction of the motor vehicle that is perpendicular to the fore-and-aft direction.

This application is based on Japanese Patent Application No. 10-133887, filed on May 15, 1998, the entire contents of which, inclusive of the specification, claims and drawings, are hereby incorporated by reference herein.

Although the invention has been described above by reference to certain embodiments of the invention, the invention is not limited to the embodiments described above. Modifications and variations of the embodiment described above will occur to those skilled in the art, in light of the above teachings. The scope of the invention is defined with reference to the following claims.

What is claimed is:

1. A lubrication apparatus in a power transmission unit in a motor vehicle, comprising:

a rotatable shaft;

a casing receiving said shaft, said casing having end portions spaced in a direction of the axis of said shaft;

a bearing supporting said shaft, said bearing being disposed at an axial end portion of said casing;

a pickup member carried on said shaft; and a trough which extends along a side of said casing from said bearing to a position which is at least opposite said pickup, said trough being open to an interior of the casing along its length, and inclined along its length relative to an axis of said shaft to allow lubricating fluid, picked up by said pickup member and flung into the trough via its rotation, to flow, under the influence of gravity, toward the bearing, the inclination of the trough being selected to be steeper than a maximum angle with respect to the horizontal to which the shaft can become tilted to permit lubricating fluid to flow to said bearing under the influence of gravity even when the shaft is tilted to the maximum angle, the maximum angle being a critical angle for stability of the motor vehicle at which the motor vehicle can be prevented from slipping down when the motor vehicle is stopped on a slope.

2. A lubrication apparatus as claimed in claim 1, wherein the trough is essentially straight along its whole length when viewed from a transverse angle respect to the shaft.

3. A lubrication apparatus as claimed in claim 1, wherein the trough has a narrowed portion proximate the bearing.

* * * * *